United States Patent [19]
Krausman et al.

[11] Patent Number: 5,957,094
[45] Date of Patent: Sep. 28, 1999

[54] FUEL CONTROL ENHANCEMENTS FOR A SENSORLESS FLEXIBLE FUELED VEHICLE

[75] Inventors: Howard W. Krausman, Dexter; Mark E. Hope; Shean Huff, both of Ann Arbor; Mary Joyce, Farmington Hills; Gary L. Seitz, Chelsea, all of Mich.

[73] Assignee: Chrysler Corporation, Auburn Hills, Mich.

[21] Appl. No.: 08/959,772

[22] Filed: Oct. 29, 1997

[51] Int. Cl.[6] .................................................. F02B 75/12
[52] U.S. Cl. ........................................ 123/1 A; 123/339.1
[58] Field of Search .............................. 123/1 A, 339.1, 123/339.19

[56] References Cited

U.S. PATENT DOCUMENTS

| | | |
|---|---|---|
| 4,967,714 | 11/1990 | Inoue ........................................ 123/489 |
| 5,183,021 | 2/1993 | Suga et al. ................................ 123/478 |
| 5,255,661 | 10/1993 | Nankee, II et al. . |
| 5,335,637 | 8/1994 | Davis et al. . |
| 5,365,917 | 11/1994 | Adams et al. . |
| 5,400,762 | 3/1995 | Fodale et al. . |
| 5,415,145 | 5/1995 | Letcher et al. . |
| 5,435,285 | 7/1995 | Adams et al. . |
| 5,467,755 | 11/1995 | Konrad et al. . |
| 5,497,753 | 3/1996 | Kopera . |
| 5,520,162 | 5/1996 | Rotramel et al. . |
| 5,528,500 | 6/1996 | Al-Charif et al. ..................... 123/339.1 |
| 5,575,255 | 11/1996 | Abe et al. ............................... 123/339.1 |

*Primary Examiner*—John Kwon
*Attorney, Agent, or Firm*—Mark P. Calcaterra

[57] ABSTRACT

The present invention provides a method of controlling operating parameters of a motor vehicle capable of operating on more than one type of fuel. The methodology employs a separate idle air control enrichment fuel multiplier for optimizing idle air control operating conditions. The methodology also employs a separate transient enrichment fuel multiplier for optimizing transient operating conditions.

2 Claims, 1 Drawing Sheet

FUEL CONTROL ENHANCEMENTS FOR A SENSORLESS FLEXIBLE FUELED VEHICLE

BACKGROUND OF THE INVENTION

1. Technical Field

The present invention relates generally to fuel control systems and, more particularly, to a method of controlling the combustion parameters of an internal combustion engine in a motor vehicle capable of operating on more than one type of fuel.

2. Discussion

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is therefore in demand. Modifications to the engine are necessary when operating on different fuels because of the different characteristics of each fuel. For example, an engine operating on ethanol or E85 (a blend of 85% ethanol and 15% gasoline) requires approximately 1.4 times the amount of fuel relative to gasoline at stoichiometry due to a lower energy content of the ethanol.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being supplied in proportion to the amount of air to achieve perfect combustion. Likewise, if the air/fuel ratio is greater than stoichiometric, an engine is said to be operating lean, i.e., too much air is being supplied in proportion to the amount of fuel to achieve perfect combustion. Alcohol fuels have a lower air/fuel ratio than gasoline at stoichiometric, so that the engine must be compensated for in the rich direction as the percentage of alcohol in the fuel increases.

Some flexible fuel compensation control systems are designed to modify the gasoline fuel and spark calibrations based on input from a fuel composition sensor for optimum engine efficiency and performance. Other flexible fuel compensation control systems use a learned fuel alcohol content instead of a fuel composition sensor to adjust the gasoline calibration. These "sensorless" type control systems provide unique challenges for setting optimum engine operating parameters.

For instance, idle air control (IAC) enrichments may be too large when required transient enrichments for alcohol are applied to idle air control fuel in cold ambient conditions. Also, the required alcohol fuel during cold engine operation may not be the same for all engine loads at a given alcohol content and engine temperature. Furthermore, the alcohol injected fuel correction factors and cold ambient conditions may be largely different from an idle condition to a driving condition.

Therefore, it would be desirable to provide a method for providing the same level of engine performance when operating on alcohol fuels as for gasoline fuel for all driving conditions.

SUMMARY OF THE INVENTION

It is, therefore, one object of the present invention to provide a system of flexible fuel compensation.

It is another object of the present invention to provide a flexible fuel compensation system which provides a separate idle air control enrichment compensation and a separate transient enrichment compensation for alcohol fuels where larger transient enrichments are required during cold engine operation.

It is yet another object of the present invention to provide a flexible fuel compensation system that modifies alcohol cold load enrichment based on engine load, percent alcohol content, and coolant temperature.

It is still another object of the present invention to provide a flexible fuel compensation system that provides a means of resetting a fuel control system to a nominal condition when transferring from a large negative idle fuel factor to an off-idle condition.

The above and other objects are provided by a method of controlling the operating parameters of an internal combustion engine used in a flexible fueled vehicle. The methodology employs a separate alcohol idle air control enrichment fuel multiplier and a separate transient enrichment fuel multiplier for optimizing both idle air control and transient (i.e., changing load and/or engine speed) operating conditions. Also, the alcohol fuel delivered to the engine is optimized during cold engine operation for all engine load conditions, alcohol percentages and engine coolant temperatures. Additionally, the fuel correction factor is reset to a richer nominal condition when transitioning from an idle condition that has a large negative correction factor to a driving condition which may require a positive correction factor.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
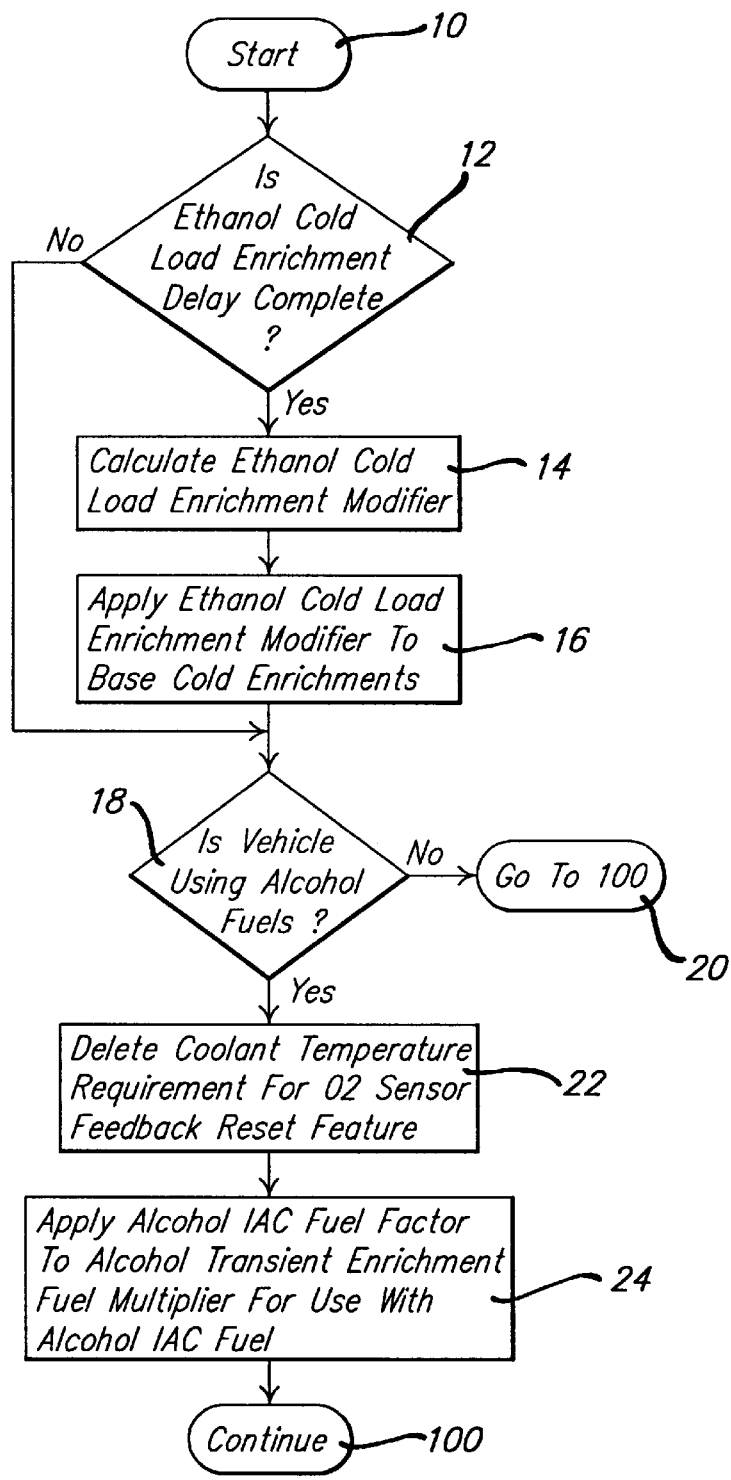
FIG. 1 is a flow chart of a method of flexible fuel compensation control for a flexible fueled vehicle.

The present invention is directed towards a method of controlling the operating parameters of an internal combustion engine in a flexible fueled vehicle. The method optimizes alcohol idle air control enrichments when the required alcohol transient enrichments are applied to alcohol idle air control fuel in cold ambient conditions. The methodology also optimizes the alcohol fuel delivered to the engine according to engine load conditions, alcohol percentages and engine coolant temperatures. Additionally, the methodology resets the fuel correction factor to a richer nominal condition when transitioning from an idle condition to a driving condition. Although the present invention is suitable for use in conjunction with a number of fuel control systems, a preferred fuel control system is disclosed in U.S. Ser. No. 08/953,411, entitled "Method of Determining a Composition of Fuel in a Flexible Fueled Vehicle" to Nankee II et al. which is incorporated by reference herein.

According to the present invention, when operating on ethanol fuel, during an alcohol idle air control enrichment, the alcohol transient enrichment factor is multiplied by a calibratable constant (the alcohol fuel factor) before applying the enrichment to the alcohol idle air control fuel. The idle air control factor preferably ranges between zero and one. As such, the product of the alcohol idle air control fuel factor and the alcohol transient enrichment factor limits alcohol idle air control enrichments to a known base. Preferably, the alcohol idle air control enrichments are prevented from being reduced to a level lower than those used for gasoline operation.

Additionally, the alcohol cold enrichments are modified by the product of a multiplier based on ethanol content and engine load, and a multiplier based on temperature. A delay after the engine starts is accounted for before the alcohol cold load enrichment modifier is applied. Furthermore, a short term oxygen sensor feedback variable reset feature is enabled at all temperatures on ethanol blends above a given threshold. This is opposed to the typical gasoline function of only enabling the reset feature above a calibratable coolant temperature. The short term oxygen sensor feedback variable reset feature resets the short term oxygen feedback variable to a nominal value if it has a large negative value when transitioning from an idle condition to a driving condition.

1. Idle Air Control Fueling Enrichment Reduction for Alcohol Based Fuel

When an engine transient condition occurs such as an increase in engine load or engine speed, an increase in the amount of fuel needed to be delivered to the engine is required. The oxygen sensor feedback system utilized in a sensorless type fuel control system typically must register a fueling error before it will increase the fuel delivered. This delay in delivering the additional fuel adversely effects engine performance. To correct this problem, the present invention enriches the fuel delivered to the engine when an engine transient condition is detected by a change in a known parameter such as engine load or throttle position to avoid lean fueling errors. It should also be noted that because of the increased energy required to vaporize alcohol as compared to gasoline, the enrichments needed for transient engine conditions are greater for alcohol than for gasoline.

Another condition that requires fuel enrichment is when a large change occurs in the idle air control. For gasoline operation, idle air control fuel is separate from other transient enrichment conditions. However, the same enrichment, based on alcohol content and coolant temperature, is commonly applied to the gasoline idle air control enrichment and also to all other gasoline transient enrichments, for use as the alcohol idle air control enrichment and the alcohol transient enrichment. It has now been found that using alcohol transient enrichments for alcohol idle air control fuel causes large rich fueling errors that effect engine performance. In accordance with the teachings of the present invention, a discrete alcohol idle air control fuel factor is implemented to reduce the alcohol transient enrichments so that they can be used (as modified) as alcohol idle air control enrichment. As such, the alcohol idle air control enrichment is based on (i.e., the product of) the alcohol idle air control fuel factor and the alcohol transient enrichment.

2. Cold Load Enrichments

Fuel enrichments are required during cold engine operation because of the reduced level of fuel vaporization at these temperatures. As is known, cold enrichments are dependant on engine load. Also, as the alcohol content of the fuel increases and the engine temperature changes, the dependency of the cold load enrichments on engine load changes.

According to one aspect of the present invention, the ethanol cold load enrichment is modified by the product of a multiplier from a surface which is based on ethanol content and engine load, and a multiplier from a table which is based on temperature. A delay after the engine starts is accounted for before the alcohol cold load enrichment modifier is applied to allow the engine speed to stabilize after engine start-up.

3. Short Term Oxygen Sensor Feedback Variable Reset Feature

A short term oxygen sensor feedback variable is commonly employed in fuel control systems for setting various engine operating and fueling parameters. When the vehicle transitions from an idle condition that has a large negative short term oxygen sensor feedback variable to a driving condition when large amounts of fuel purge vapors are present, the short term oxygen sensor feedback variable is unstable. As such, the short term oxygen sensor feedback variable is reset to a nominal value when this unstable condition exists. Since fuel purge vapors only present a problem at high ambient temperatures when operating on gasoline, this feature is only enabled when the engine temperature exceeds a known threshold for gasoline operation.

However, when operating on ethanol based fuels, other conditions exist which can cause the short term oxygen sensor feedback variable to be unstable. For example, when operating with a sensorless fuel control system that utilizes inferred ethanol content as opposed to a fuel composition sensor, the conventional multi-celled long term fuel adaptive memory is replaced with a single cell purge multiplier that is only used when the vehicle's vapor management system is active. Therefore, in the absence of the present invention, the fuel control system is not able to adapt to the differing fuel requirements between an idle condition and a driving condition.

A second condition that exists for ethanol operation that causes the short term oxygen sensor feedback variable to be unstable is that cold engine enrichments are harder to manage when operating on the less volatile alcohol fuels. A third example is that the short term oxygen sensor feedback variable is unstable during a fuel blend from either gasoline to ethanol or ethanol to gasoline. To account for these conditions, the present invention enables the short term oxygen sensor feedback variable reset feature at all engine temperatures for ethanol blends above a known threshold (e.g., greater than 30% ethanol). The continuous resetting of the short term oxygen sensor feedback variable prevents the fueling from significantly erring in the lean direction when the vehicle transitions from and idle condition to a driving condition.

Turning now to the drawing figure, FIG. 1 illustrates a flow chart for a method of flexible fuel compensation control for a flexible fueled vehicle. The methodology starts in bubble 10 and advances to decision block 12. In decision block 12, the methodology determines if the ethanol cold load enrichment delay is complete. The delay timer ensures that a predetermined period of time has elapsed before applying a cold load enrichment modifier for cold start conditions. If so, the methodology advances to block 14.

In block 14, the methodology calculates the ethanol cold load enrichment modifier value. This modifier is the product of a fuel surface multiplier and a table multiplicative factor. The fuel surface multiplier is based on ethanol content and engine load and the table multiplicative factor is based on coolant temperature.

After calculating the ethanol cold load enrichment modifier in block 14, the methodology advances to block 16. In block 16, the methodology applies the ethanol cold load enrichment modifier to the base cold enrichments for the internal combustion engine. After applying the ethanol cold load modifier to the base cold enrichments, or if the ethanol cold load enrichment delay is not complete at decision block 12, the methodology advances to decision block 18. In decision block 18, the methodology determines if the vehicle is operating on an alcohol based fuel.

If the vehicle is not operating on an alcohol based fuel, the methodology advances to bubble 20 and is forwarded to bubble 100 where it returns to start-up bubble 10. If the vehicle is operating on an alcohol based fuel in decision block 18, the methodology advances to block is 22. In block 22, the methodology removes the coolant temperature requirement for a short term oxygen sensor feedback variable reset feature. After removing the coolant temperature requirement for the short term oxygen sensor feedback variable reset feature at block 22, the methodology advances to block 24. In block 24, the methodology applies the alcohol idle air control fuel factor to the alcohol transient enrichment fuel multiplier for use with alcohol idle air control fuel. From block 24 the methodology advances to bubble 100 where it is returned to bubble 10.

According to the above, the present invention provides a method for controlling the operating parameters of an internal combustion engine. The methodology employs a separate alcohol based idle air control fuel enrichment fuel multiplier and a separate transient enrichment fuel multiplier for optimizing both operating conditions. Also, the alcohol fuel delivered to the engine is optimized during cold engine operation for all engine load conditions, alcohol percentages and engine coolant temperatures. Furthermore, the fuel correction factor is reset to a richer nominal condition when transitioning from an idle condition that has a large negative correction factor to a driving condition which may require a positive correction factor.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of controlling combustion parameters of an internal combustion engine in a flexible fueled vehicle comprising:

monitoring said internal combustion engine for an idle air control enrichment condition;

monitoring said internal combustion engine for a transient enrichment condition;

setting said combustion parameters according to a first fueling strategy if said idle air control enrichment condition is detected; and setting said combustion parameters according to a second fueling strategy if said transient enrichment condition is detected;

wherein said first fueling strategy for said idle air control enrichment condition corresponds to an alcohol idle air control fuel factor and an alcohol transient enrichment factor.

2. The method of claim 1 wherein said alcohol idle air control fuel factor and said alcohol transient enrichment factor limits said first fueling strategy to a lower limit such that alcohol idle air control enrichments are not reduced to a value below those used for gasoline operation.

* * * * *